United States Patent [19]
Yamamoto et al.

[11] Patent Number: 5,385,317
[45] Date of Patent: Jan. 31, 1995

[54] LONG FILM RECEPTACLE

[75] Inventors: Takaharu Yamamoto; Masahiro Sugimura, both of Kyoto, Japan

[73] Assignee: Dainippon Screen Mfg. Co., Ltd., Kyoto, Japan

[21] Appl. No.: 904,821

[22] Filed: Jun. 26, 1992

[30] Foreign Application Priority Data

Jun. 28, 1991 [JP] Japan ................... 3-185672

[51] Int. Cl.⁶ ............................................ B65H 18/08
[52] U.S. Cl. ................................. 242/595; 242/595.1; 242/535
[58] Field of Search .................... 242/71, 71.1, 71.7, 242/71.8, 55.53, DIG. 3, 595, 595.1, 535; 354/275, 277; 352/75, 78 R; 355/72

[56] References Cited

U.S. PATENT DOCUMENTS

| | | | |
|---|---|---|---|
| 1,930,335 | 10/1933 | Bornmann | 242/71.1 |
| 2,484,248 | 10/1949 | Roehrl | 242/71.1 |
| 2,614,763 | 10/1952 | Horton et al. | 242/71 |
| 2,709,050 | 5/1955 | Mansberg | 242/71.1 |
| 3,288,389 | 11/1966 | Gersch et al. | 242/71.1 |
| 3,333,785 | 8/1967 | Baur et al. | 242/71.1 |
| 3,356,311 | 12/1967 | Winkler et al. | 242/71.1 |
| 3,715,963 | 2/1973 | Le Cover | 242/71.1 X |
| 4,068,809 | 1/1978 | Koester | 242/71.1 X |
| 4,482,232 | 11/1984 | Engelsmann et al. | 242/71.7 X |
| 4,838,497 | 6/1989 | Kramer et al. | 242/DIG. 3 |

FOREIGN PATENT DOCUMENTS

| | | | |
|---|---|---|---|
| 0447192 | 9/1991 | European Pat. Off. | |
| 654344 | 4/1929 | France | 242/71.1 |
| 780118 | 4/1935 | France | 242/71.1 |
| 929765 | 1/1948 | France | 242/71.1 |
| 1424330 | 11/1965 | France | 242/71.1 |
| 2807233 | 8/1978 | Germany | 242/71.1 |
| 2-39145 | 8/1990 | Japan | |
| 1112349 | 5/1968 | United Kingdom | 242/71.1 |
| 8909742 | 10/1989 | WIPO | |

*Primary Examiner*—Daniel P. Stodola
*Assistant Examiner*—John P. Darling
*Attorney, Agent, or Firm*—Ostrolenk, Faber, Gerb & Soffen

[57] ABSTRACT

A film receptacle for winding a long length of film including a film box having an entrance for admitting a film and a winding member provided in the film box. The winding member including a curled holding portion for winding the film admitted through the entrance and holding for a roll of the film thus wound. The holding portion has a resilience to an expanding force of the film roll in the holding portion, and the resilience is such that the increase in the radius of curvature of the holding portion when the film is wound one turn in the holding portion is substantially equal to the thickness of the film. Thus, newly entering film is wound over the roll of the already wound film, and no slip or friction occurs within the film roll, which facilitates continuous admission of a long length of film at a constant force.

9 Claims, 6 Drawing Sheets

LONG FILM RECEPTACLE

The present invention relates to a receptacle for winding and holding a continuously-fed long length of film such as an exposure film or a print paper.

BACKGROUND OF THE INVENTION

There are two ways of winding a long length of film: one is winding it onto a core (core winding) and the other is winding it without a core (coreless winding). The core winding method is not suited to automatic and high-speed processing of an exposure film, because at the beginning of winding the leading end of the film should be securely fixed to the core and an appropriate handling of the core is necessary in the developing process.

In a coreless winding method, a film is continuously wound (or involuted) in a cylindrical container. The problem with this method is that friction occurs between the layers of the roll of film. When film is continuously wound in a container of a fixed diameter, there must be some slip between the adjacent layers of the film, as well as between the film and the inside wall of the container. The area of the slippage increases as the film is wound in the container, and the frictional force increases as the slipping area increases. When the length of the film wound in the container exceeds a certain amount, the frictional force becomes too large, and the film can no longer be fed into the container and the film begins to jam at the entrance of the container.

A mechanism for alleviating this problem is shown in the Japanese Unexamined Patent Application No. H2-39145 in which the radius of the roll of film wound is allowed to increase as the film is wound. The mechanism is constructed as follows. In a container, two driving rollers are disposed at the bottom, two rollers are disposed at the side and three rollers are provided at the top to form an inscribed cylinder in which a film is wound. The two side rollers are held by an arm and the three top rollers are held by another arm, where both arms can swing in the container and are urged by respective springs towards the inscribed cylinder. As more film is wound in the inscribed cylinder, the wound film tends to evolve and exerts an expanding force on the cylinder by virtue of its elasticity. The arms (and the rollers held by the arms) thus swing outward, allowing increase in the outer radius of the roll of the wound film.

Since the outer radius of the film increases as the film is wound, the newly wound portion of the film is wound on the pre-existing roll of the already wound film. This means that no slip in the roll of the already wound long film occurs. Thus, using the prior art winding mechanism, a long film can be smoothly fed into the container with almost a constant force.

The prior art winding mechanism, however, needs many rollers to define a well-shaped inscribed cylinder for smoothly winding the film, and a complicated swing mechanism is also required for each arm in order to increase the radius of the inscribed cylinder while keeping an adequate cylinder shape.

SUMMARY OF THE INVENTION

The present invention provides a long film receptacle that can wind a long length of film smoothly without using a core and with a very simple coreless film winding mechanism.

According to the present invention, a long film receptacle comprises:

a) a film box having an entrance for admitting a film; and b) a winding member provided in the film box and including a curved holding portion for winding the film coming through the entrance and for holding a roll of the film thus wound. The holding portion is resilient to an expanding force of the roll of the film wound within the holding portion.

Here the resilience of the holding portion is preferably such that the increase in the radius of curvature of the holding portion when the film is wound one turn in the holding portion is equal to or greater than the thickness of the film. More preferably, the resilience of the holding portion is such that the increase in the radius of curvature of the holding portion when the film is wound one turn in the holding portion is substantially equal to the thickness of the film.

When a long film enters the film box through the entrance, the film is wound in the holding portion of the winding member and forms a roll of film (film roll) within the holding portion. Since the holding portion is resilient to the expanding force of the film roll, the newly entering portion of the film is wound over the previously wound film roll and the roll of the already wound film need not be reduced, which allows a continuous admission of a long film into the holding portion with a constant force.

DETAILED DESCRIPTION OF A PREFERRED EMBODIMENT

Figure 3:
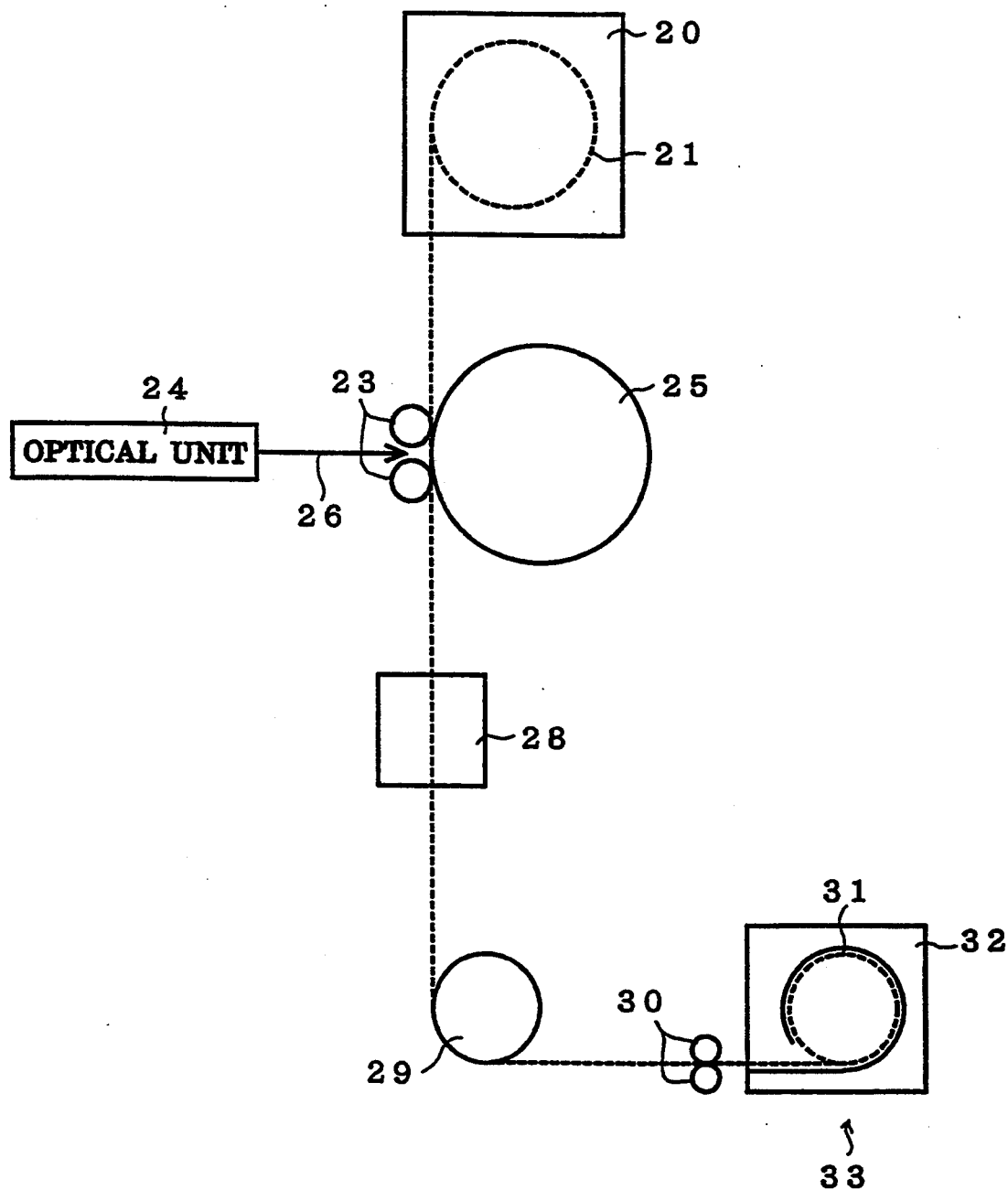
FIG. 3 is a schematic side view of a film exposing apparatus incorporating the film receptacle of the present invention.

The first embodiment of the present invention is described with reference to the film exposing apparatus illustrated in FIG. 3. In the film exposing apparatus, an unexposed long length of film 21 stored in a film magazine 20 is drawn out of the film magazine 20 and passes through a preset exposing site where several images are continuously recorded thereon. After exposure, the exposed film 31 is wound in a film box 32, and the film box 32 is moved to a developer where the exposed film 31 is processed to develop the images.

The movement of the film in the film exposing apparatus is detailed hereinbelow. An unexposed film 21 drawn out of the film magazine 20 is conveyed between a main roller 25 and a pair of nip rollers 23, where the film 21, transported through a narrow gap between the nip rollers 23, is irradiated by a laser beam 26 generated by an optical unit 24. While the film 21 is moved downward, the laser beam 26 is scanned into the gap perpendicular to the movement of the film 21, (that is, parallel to the axes of the main roller 25 and the nip rollers 23), whereby a two-dimensional latent image is formed on the film 21, as shown in FIG. 3. The film 31 exposed by the laser beam 26 passes downward through a cutter unit 28, turns 90° at an idle roller 29, and is fed into a long film receptacle 33 by a pair of entrance rollers 30. In the exposing apparatus of the present embodiment, the exposed film 31 is cut by the cutter unit 28 after a preset number of latent images are formed on the film 31.

Figure 1:
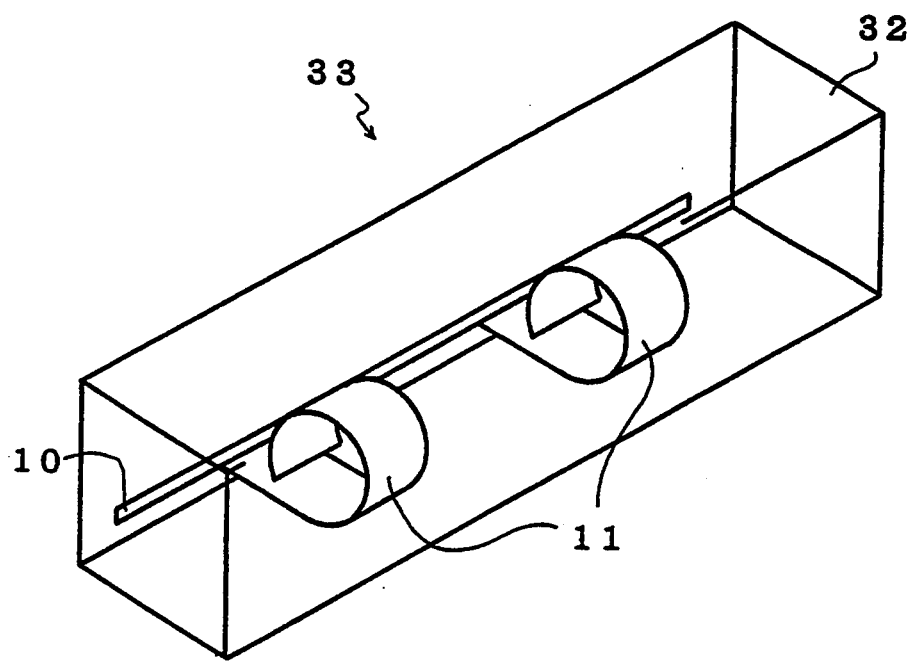
FIG. 1 is an internal perspective view of an internal portion of one embodiment of the film receptacle of the present invention.
Figure 2A:
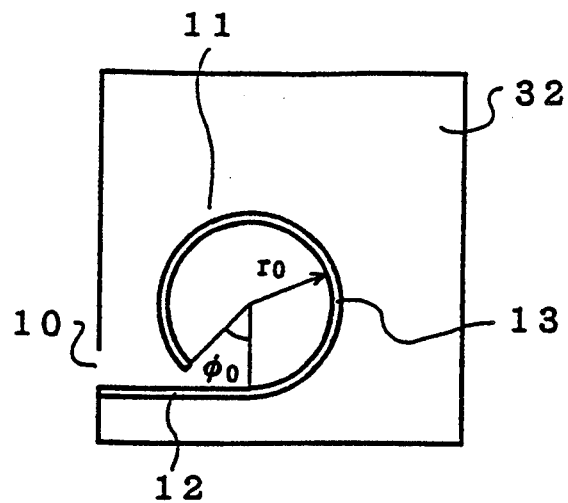
FIG. 2A is a cross-sectional view of the film receptacle of the first embodiment at the initial state of winding.

As shown in FIG. 1, the film receptacle 33 includes a film box 32 and a pair of winding members 11. An entrance slit 10 is formed on one side of the film box 32 for admitting a long length of film. As shown in FIG. 2A, each of the winding members 11 is composed of a flat introductory portion 12 and a substantially circular holding portion 13. The leading end of the introductory portion 12 is fixed at the lower edge of the entrance slit 10 of the film box 32. The other end of the introductory portion 12 continuously connects to an end of the holding portion 13, and the other end of the holding portion 13 is free. The introductory portion 12 and the holding portion 13 can be made integrally or separately.

The initial state of a winding member 11 when no film is yet wound inside, is shown in FIG. 2A. The opening angle $\Phi_0$ of the holding portion 13 at the initial state is set at 0°-85° in the embodiment. If the angle $\Phi_0$ is larger than 85°, a film 31 cannot be wound inside the holding portion 13.

Figure 2B:
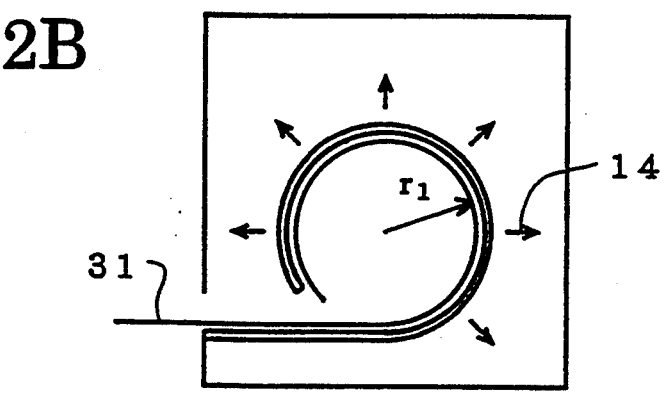
FIG. 2B illustrates the receptacle after the film is wound one turn.
Figure 2C:
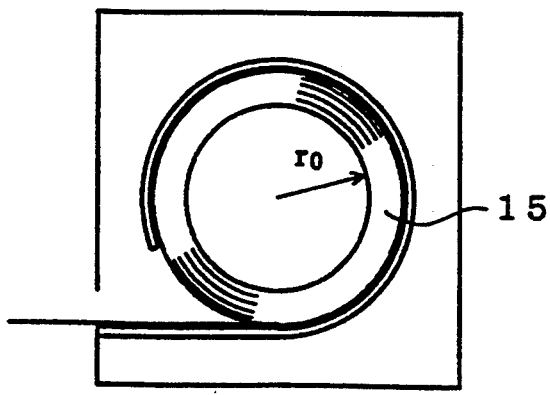
FIG. 2C illustrates the film receptacle after a long length of film has been wound therein.

After a film 31 enters from the slit 10 and contacts the holding portion 13, the leading end of the film 31 slides on the inside wall of the holding portion 13. As the film 31 is thus wound, or forced to bend, in the holding portion 13, the film 13 tends to become straight and exerts a straightening, or expanding force 14 on the holding portion 13, whereby the holding portion 13 is expanded outward, as shown in FIG. 2B. The radius of curvature of the holding portion 13 becomes $r_1$ when the film 31 is wound one turn (360°) in the holding portion 13 from the radius of curvature $r_0$ at the initial state. It is important to set the increase ($\Delta r = r_1 - r_0$) in the radius of curvature equal to or greater than the thickness t of the would film 31. Under such condition, as the film 31 enters the film box 32 and is wound in the holding portion 13, the overall diameter of the film roll 15 consisting of already wound film 31 does not decrease, but newly entering film 31 is wound outside of the already existing film roll 15, as shown in FIG. 2C. This means that there is no slip between films of the existing film roll 15, and the only force resisting the entrance of film 31 into the film box 32 is a frictional force due to the slip between the outermost layer of the film (that is the newly entering film) 31 and the inner wall of the holding portion 13. Thus film 31 can be continuously fed into the film box 32 with a constant force even after the film 31 is wound many times in the holding portion 13.

In order for the radius of curvature of the holding portion 13 to increase the elasticity of the holding portion 13 must have a certain relationship with that of the film 31 to be wound therein. The relationship is discussed hereinbelow. Provided the flexural rigidity of the film 31 is $E_f I_f$ (where $E_f$ is the elastic modulus and $I_f$ is the second moment of area of the film 31) and the flexural rigidity of the holding portion 13 is $E_p \cdot I_p$ (here $E_p$ is the elastic modulus and $I_p$ is the second moment of area of the holding portion 13), a bending moment $M_f$ necessary to bend an originally planar film 31 into a cylinder of radius $r_1$ is given as:

$$M_f = (E_f I_f)/r_1. \tag{1}$$

On the other hand, a bending moment $M_p$ necessary to increase the original radius $r_0$ of a holding portion 13 to $r_1$ (here $r_1 > r_0$) is given from the equation:

$$1/r_1 - 1/r_0 = M_p/(E_p \cdot I_p). \tag{2}$$

The two bending moments $M_f$ and $M_p$ are in equilibrium at the state shown in FIG. 2B. In this case, $$M_f + M_p = 0. \tag{3}$$

From equations (1) through (3), the following equation is derived.

$$r_1 - r_0 = \{(E_f I_f)/(E_p \cdot I_p)\} \cdot r_0 \tag{4}$$

Equation (4) gives the amount of increase in the radius of curvature of the holding portion 13 when a film 31 is wound one turn. If the increase ($\Delta r = r_1 - r_0$) in the radius of curvature is equal to or greater than the thickness t of the film 31, that is:

$$\Delta r = r_1 - r_0 \geq t, \tag{5}$$

the above-described condition is satisfied. This means that, by setting the flexural rigidity $E_p \cdot I_p$ and the initial radius of curvature $r_0$ of the holding portion 13 as:

$$r_0/(E_p \cdot I_p) \geq t/(E_f I_f), \tag{6}$$

a film 31 newly fed into the holding portion 13 is wound onto a roll 15 of already wound film and no slip occurs within the film roll 15.

If the setting of the left term of the inequality (6) is increased, the increase in the radius of the film roll 15 for one additional fold of a film layer is greater than the thickness t of the film 31. Though, in this case, slips may occur within the film roll 15 to adjust the radius of the film roll 15 to that of the holding portion 13, the direction of the slips is opposite to the moving direction of the film 31 fed so that the slips do not impede the feeding of the film 31 into film box 32. From the viewpoint of the film containing efficiency of the film box 32, however, the value of $r_0/(E_p \cdot I_p)$ is preferably set close to or substantially equal to the value of $t/(E_f I_f)$.

The second moment of area I ($I_f$ for the film 31 and $I_p$ for the holding portion 13) is calculated as $$I = b \cdot h^3/12,$$

where h is the thickness and b is the width of the holding portion 13 or the film 31. The value of the elastic modulus E for those materials can be found in various material handbooks or the like. Thus the values of the flexural rigidity $E_f I_f$ and $E_p \cdot I_p$ can be calculated. Alternatively the values of the flexural rigidity $E_f I_f$ and $E_p \cdot I_p$ can be directly obtained by actually bending the holding portion 13 and the film 31, and from the ratio of the experimentally obtained values, the width b and thickness t of the holding portion 13 can be determined properly.

Thus, when the film receptacle 33 is made, the values of the thickness t and flexural rigidity $E_f·I_f$ of the film 31 to be treated are applied in the formula (6) to obtain the flexural rigidity $E_p·I_p$ and the initial radius of curvature $r_0$ of the holding portion 13, which determines the material, dimensions and the initial form (that is, the radius of curvature $r_0$) of the holding portion 13.

The holding portion 13 can be made by a formed metal plate (such as a stainless steel (SUS) plate or aluminum plate) or a formed plastic plate. When a formed metal plate is used, a plastic film is preferably coated on the inside wall of the holding portion 13 to produce better slip with the film 31.

The introductory portion 12 need not have a specific elasticity since it only guides the film 31 into the holding portion 13. Therefore a metal plate or plastic plate having a stiffness higher than that of the holding portion 13 can be used for the introductory portion 12. It is merely a design choice to form the introductory portion 12 and the holding portion 13 integrally or separately.

Figure 4A:
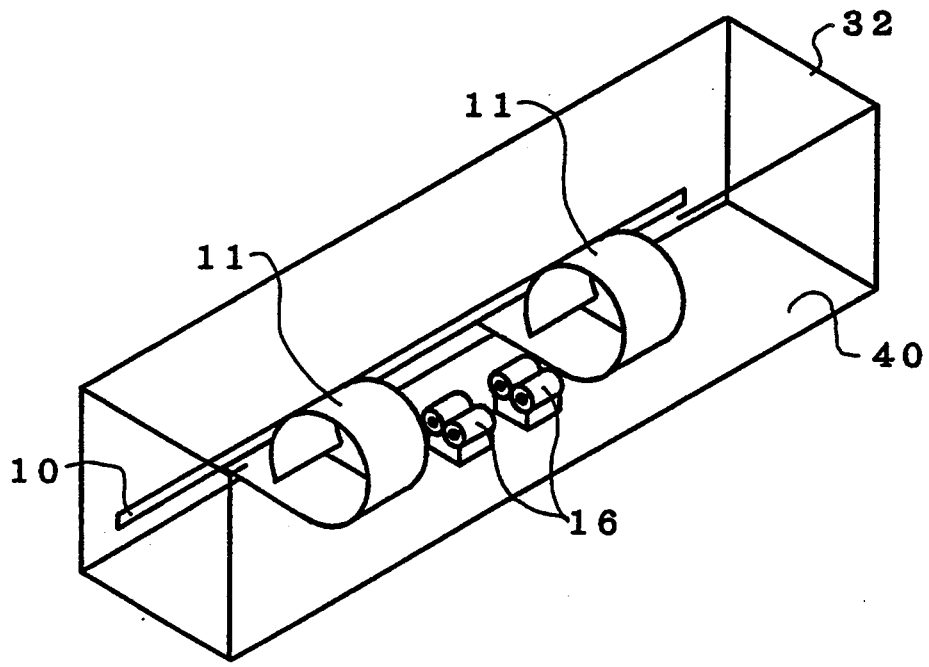
FIG. 4A is an internal perspective view of a film receptacle according to a second embodiment of the present invention.
Figure 4B:
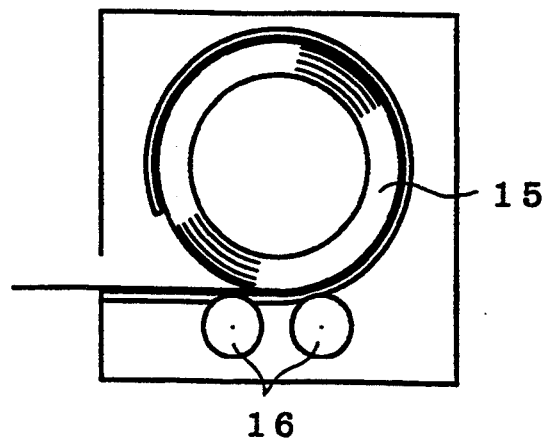
FIG. 4B is a cross-sectional view of FIG. 4A.
Figure 5A:
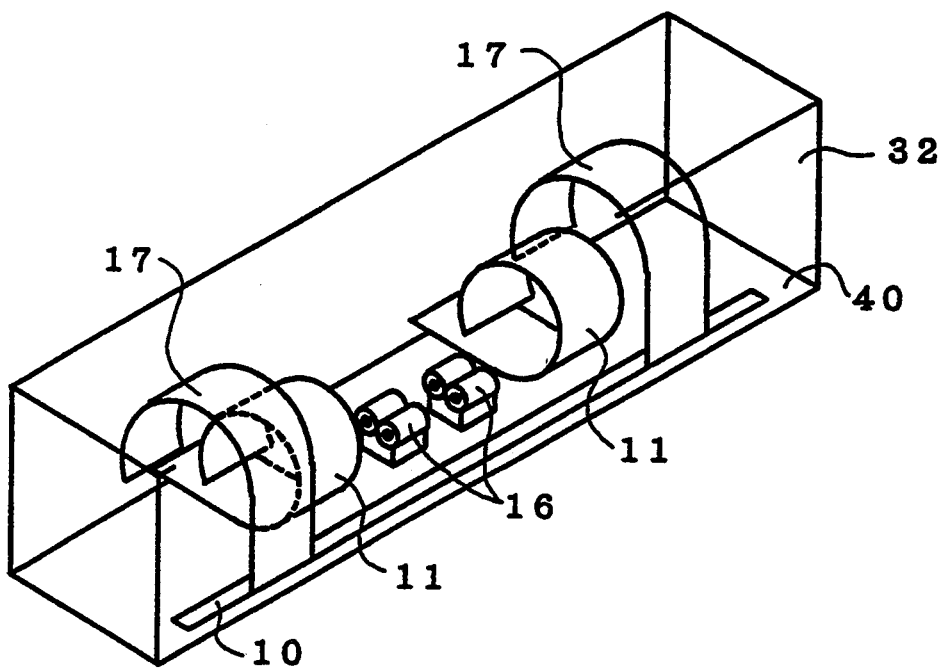
FIG. 5A is an internal perspective view of a third embodiment of a film receptacle of the present invention.
Figure 5B:
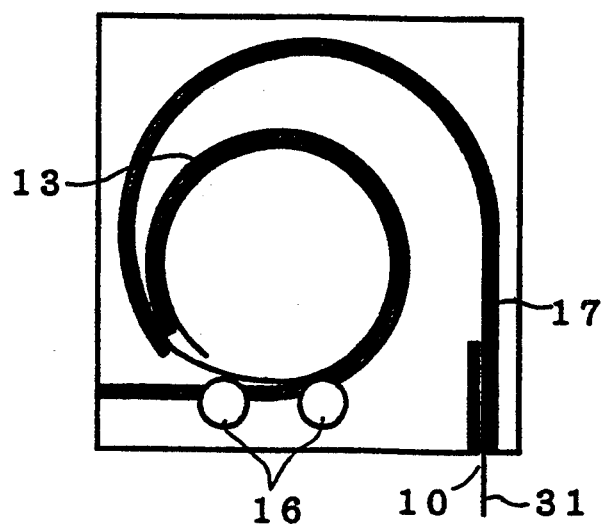
FIG. 5B is a cross-sectional view.

The second embodiment of the present invention is described referring to FIGS. 4A and 4B. In the long film receptacle 33 of the present embodiment, two sets of idle roller pairs 16 are provided on the bottom 40 of the film box 32 to sustain film roll wound in the holding portion 13 of the winding member 11. When a very long film is wound without such idle rollers 16, the film roll in the holding portion 13 becomes so heavy that the winding member 11 hangs downward with the film roll and subsequent film winding becomes impossible. The roller pairs 16 sustain and fix the position of the film roll to enable an ever sure film winding. A variation of the film receptacle 33 of FIGS. 4A and 4E is shown in FIGS. 5A and 5B. In the film receptacle 33 of FIGS. 5A and 5B, a film entrance 10 is placed on the bottom 40 of the film box 32, and a pair of curled film guides 17 are provided at the film entrance 10 to introduce film into the holding portions 13.

Figure 6A:
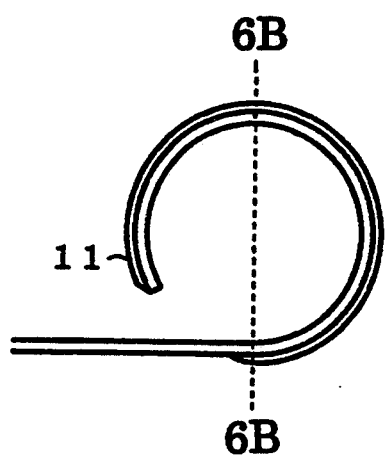
FIG. 6A is a cross-sectional view of another film holding portion of a winding member of the present invention.
Figure 6B:
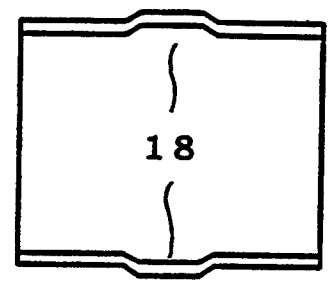
FIG. 6B is a lateral cross-sectional view along line b—b of FIG. 6A.

An improvement of a holding portion 13 is shown in FIGS. 6A and 6B which is applicable to any of the preceding embodiments. As shown in FIG. 6B, a recess 18 is formed at the central part of the holding portion 13. This reduces the area of slippage between the holding portion 13 and the film sliding on it, thus reducing the force needed to feed a long film 31 into the film box 32. In the case where the flexural rigidity of the holding portion 13 increases due to the recess 18, the width and thickness of the holding portion 13 may be adjusted to maintain the original flexural rigidity.

What is claimed is:

1. A film receptacle for winding and holding a long length of film, comprising:
   a film box having an entrance for admitting the film; and
   a winding member provided in the film box including a holding portion for winding the film entering the film box into a curled roll and for holding the wound roll of film, the holding portion having a radius of curvature and a resilience such that as the long length of film is wound into the roll, the holding portion and the radius of curvature expand as the size of the roll increases, and the increase in the radius of curvature of the holding portion when the film is wound one turn is equal to or greater than a thickness of the film; wherein the holding portion has a flexural rigidity ($E_p·I_p$) and an initial radius of curvature $r_o$, and the film has a flexural rigidity ($E_f·I_f$), such that when $r_o/(E_p·I_p) > t/(E_f·I_f)$, no slip occurs within the film roll when the film is fed into the holding portion and wound onto the wound roll of film, where $E_p$ is the elastic modulus, $I_p$ is the second moment of area of the holding portion, $E_f$ is the elastic modulus, $I_f$ is the second moment of area of the film, and t is the thickness of the film.

2. The film receptacle according to claim 1, wherein at least one pair of rollers is provided in the film box for supporting the roll of the film wound in the holding portion.

3. The film receptacle according to claim 2, wherein the winding member further includes an introductory portion for connecting the entrance of the film box and the holding portion.

4. The film receptacle according to claim 3, wherein a longitudinal recess is formed in an inner wall of the holding portion for reducing an area of contact between the holding portion and the film wound therein.

5. The film receptacle according to claim 1, wherein the winding member further includes an introductory portion for connecting the entrance of the film box and the holding portion.

6. The film receptacle according to claim 1, wherein a longitudinal recess is formed in an inner wall of the holding portion for reducing an area of contact between the holding portion and the film wound therein.

7. The film receptacle according to claim 1, wherein at least one guide member is provided at the entrance of the film box to introduce and guide the film entering the entrance into the holding portion.

8. The film receptacle according to claim 7, wherein a longitudinal recess is formed in an inner wall of the holding portion for reducing an area of contact between the holding portion and the film wound therein.

9. The film receptacle according to claim 1, wherein a force required to feed the film into the film box remains substantially constant during winding of the film.

* * * * *